US008010696B2

(12) United States Patent
Sankaran et al.

(10) Patent No.: US 8,010,696 B2
(45) Date of Patent: Aug. 30, 2011

(54) PASSING INFORMATION FROM A FORWARDING PLANE TO A CONTROL PLANE

(75) Inventors: Harish Sankaran, Billerica, MA (US); Janet Doong, Chelmsford, MA (US); Arun Kudur, Arlington, MA (US)

(73) Assignee: Avaya Inc., Basking Ridge, NJ (US)

( * ) Notice: Subject to any disclaimer, the term of this patent is extended or adjusted under 35 U.S.C. 154(b) by 530 days.

(21) Appl. No.: 11/422,440

(22) Filed: Jun. 6, 2006

(65) Prior Publication Data

US 2007/0280231 A1    Dec. 6, 2007

(51) Int. Cl.
 *H06F 15/16* (2006.01)
(52) U.S. Cl. ........ 709/238; 711/150; 711/154; 711/153; 711/130; 711/114; 370/431; 370/338; 370/352
(58) Field of Classification Search .................. 370/390; 709/239, 240, 203, 238; 714/49
 See application file for complete search history.

(56) References Cited

U.S. PATENT DOCUMENTS

| | | | | |
|---|---|---|---|---|
| 6,091,712 A * | 7/2000 | Pope et al. | ..................... | 370/244 |
| 7,200,865 B1 * | 4/2007 | Roscoe et al. | ................... | 726/12 |
| 7,221,660 B1 * | 5/2007 | Simonson et al. | ............ | 370/312 |
| 2002/0167910 A1 * | 11/2002 | Gammenthaler, Jr. | ........ | 370/252 |
| 2005/0013274 A1 * | 1/2005 | Pekonen et al. | ............. | 370/329 |
| 2005/0147095 A1 * | 7/2005 | Guerrero et al. | ............. | 370/390 |
| 2006/0018253 A1 * | 1/2006 | Windisch et al. | ............. | 370/216 |
| 2006/0056427 A1 | 3/2006 | Sato | | |
| 2006/0072480 A1 * | 4/2006 | Deval et al. | ................... | 370/254 |
| 2007/0104204 A1 * | 5/2007 | Brokenshire et al. | ...... | 370/395.1 |

OTHER PUBLICATIONS http://research.microsoft.com/en-us/um/people/dmaltz/papers/tesseract-nsdi07.pdf "Tesseract: A 4D Network Control Plane"—Hong Yan Carnegie Mellon University, Microsoft Research, & Rice University.*
http://www.cisco.com/en/US/docs/routers/crs/crs1/16_slot_lc/system_description/reference/guide/sysdsc8.pdf "Control Plane"—Cisco CRS Carrier Rouing System.*
http://www.juniper.net/us/en/local/pdf/whitepapers/2000261-en.pdf "Control Plane Scaling and Router Virtualization"—Juniper Networks.*
Hidell, M. et al.; "Control and Forwarding Plane Interaction in Distributed Routers"; KTH—Royal Institute of Technology; Mar. 2005; 13 pages.
Stardust Technologies, Inc.; "How IP Multicast Works"; IP Multicast Initiative; 12 pages.
Estrin, D. et al.; "Protocol Independent Multicast-Sparse Mode (PIM-SM): Protocol Specification"; The Internet Society (1998); Jun. 1998; RFC 2362; 66 pages.
Deering, S.; "Host Extensions for IP Multicasting"; Aug. 1989; RFC 1112; 17 pages.

* cited by examiner

*Primary Examiner* — Krista M Zele
*Assistant Examiner* — Randy Scott
(74) *Attorney, Agent, or Firm* — Chapin IP Law, LLC; David W. Rouille, Esq.

(57) ABSTRACT

Safe and efficient passing of information from a forwarding-plane to a control-plane is provided. The information can be passed from a forwarding-plane process to a control-plane process without having to modify the control-plane process and without requiring the processes to pass information via shared memory. The information is encoded in the forwarding-plane process. The encoded information is passed to the operating system, wherein the operating system interprets the encoded information and reports the information to the control plane process. The present invention can be advantageously utilized in passing multicast events from a forwarding-plane process to a control-plane process. Multicast events can be passed from a forwarding-plane process to a control-plane process without having to modify the control-plane process and without requiring the processes to pass messages via shared memory.

16 Claims, 1 Drawing Sheet

PASSING INFORMATION FROM A FORWARDING PLANE TO A CONTROL PLANE

FIELD OF THE INVENTION

The present invention relates generally to network systems. More particularly, the present invention relates to passing information from a forwarding plane in the network system to a control plane in the network system.

BACKGROUND OF THE INVENTION

The continued growth of the Internet in combination with demands for new services is rapidly increasing the requirements imposed on network systems, such as IP routers. The basic functions of an IP router can be divided into two main components: the forwarding plane (also referred to as the data plane) and the control plane. These components, while inter-related, perform functions that are largely independent of each other. The forwarding plane is generally responsible for a router's capacity to process and forward packets, which may include functions such as packet forwarding (also referred to as packet switching), which is the act of receiving packets on the router's interfaces and usually sending them out on other interfaces; classification; traffic shaping; and metering. The control plane is generally responsible for controlling the router. The control plane implements functions such as routing protocols, signaling protocols, control protocols (e.g., RIP, OSPF, and RSVP), and network management and dictates the forwarding behavior by manipulating forwarding tables, per-flow QoS tables, and access control lists. For example, the control plane gathers and maintains network topology information and passes this information to the forwarding plane so that the forwarding plane knows where to forward received packets. Typically, the architecture of these two components combines all of the required functionality into a single functional whole with respect to external entities. The increasing requirements put on network systems, such as IP routers, require new protocols in the routers, leading to an increased complexity in the control plane and frequently involve and affect the communication between the forwarding plane and the control plane.

SUMMARY OF THE INVENTION

The present invention addresses the communication needs between the forwarding plane and the control plane by providing for safe and efficient passing of information from a forwarding-plane process operating at a user level to a control-plane process operating at a user level. The present invention provides a more modular approach than is provided by operating systems that perform the forwarding-plane functionality while at the same time requiring less communication overhead than required by shared-memory approaches to communicating information between a forwarding-plane process at the user level and a control-plane process at the user level. In accordance with the present invention, information can be passed from a forwarding-plane process to a control-plane process without having to modify the control-plane process and without requiring the processes to pass information via shared memory. The information to be passed is encoded in the forwarding-plane process. The encoded information is first passed to the operating system, wherein the operating system interprets the encoded information and reports the information to the control plane process. The present invention can be advantageously utilized in passing multicast events from a forwarding-plane process to a control-plane process. In accordance with the present invention, multicast events can be passed from a forwarding-plane process to a control-plane process without having to modify the control-plane process and without requiring the processes to pass the multicast events via shared memory.

BRIEF DESCRIPTION OF THE DRAWING

The above and further advantages of this invention may be better understood by referring to the following description in conjunction with the accompanying drawing. The drawing is not meant to limit the scope of the invention. For clarity, not every element may be labeled in the drawing.

DETAILED DESCRIPTION OF THE INVENTION

Figure 1:
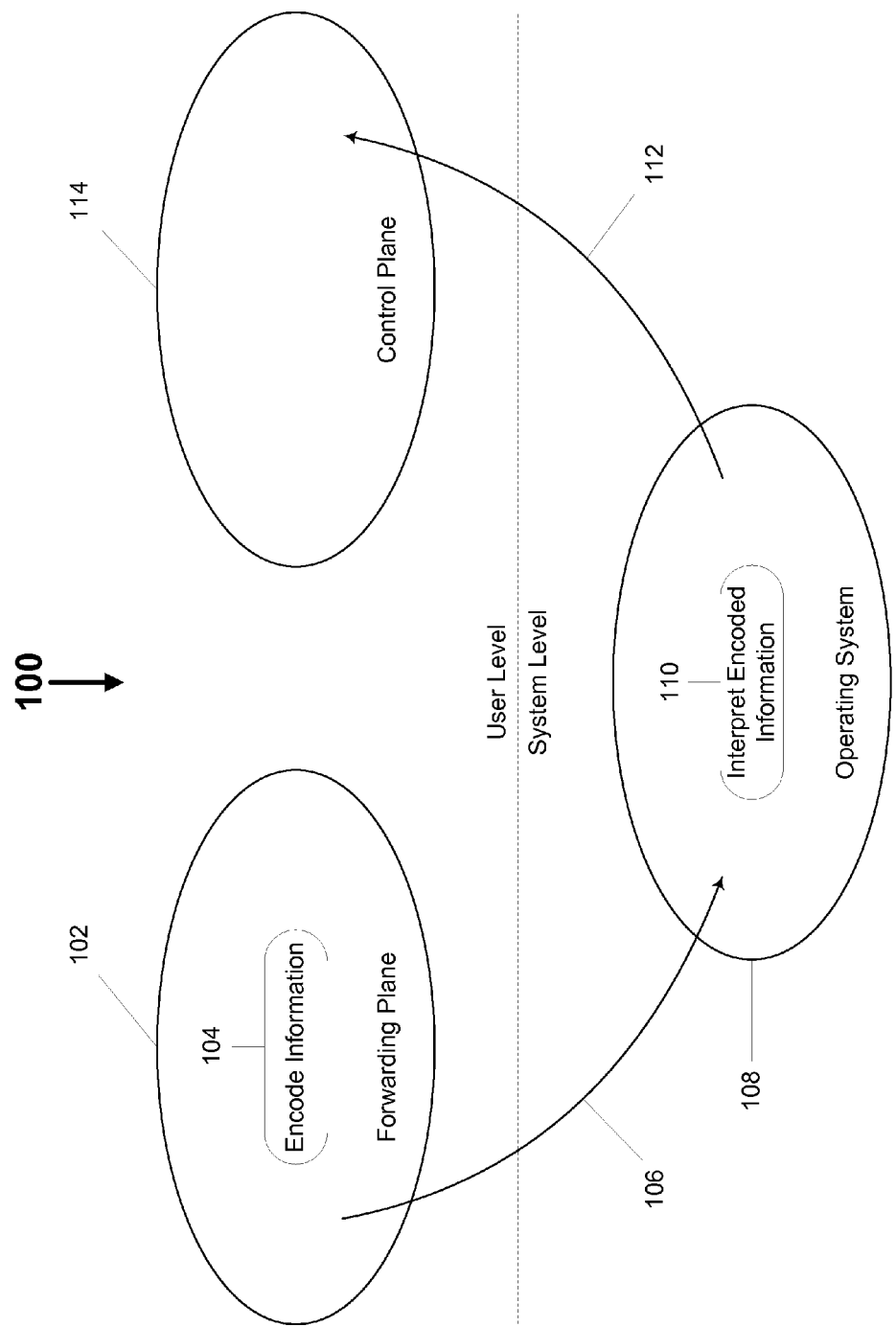
FIG. 1 illustrates a process of passing information from a forwarding plane to an operating system and then to a control plane in accordance with the present invention.

The continued growth of the Internet in combination with demands for new services is rapidly increasing the requirements imposed on network systems, such as IP routers. Network systems are also referred to in the networking industry as network nodes or network elements. The basic functions of an IP router can be divided into two main components: the forwarding plane (also referred to as the data plane) and the control plane. These components, while inter-related, perform functions that are largely independent of each other. The forwarding plane is generally responsible for a router's capacity to process and forward packets, which may include functions such as packet forwarding (also referred to as packet switching), which is the act of receiving packets on the router's interfaces and usually sending them out on other interfaces; classification; traffic shaping; and metering. The processes that execute the functionality of the forwarding plane are referred to herein as forwarding-plane processes. The control plane is generally responsible for controlling the router. The control plane implements functions such as routing protocols, signaling protocols, control protocols (e.g., RIP, OSPF, and RSVP), and network management and dictates the forwarding behavior by manipulating forwarding tables, per-flow QoS tables, and access control lists. For example, the control plane gathers and maintains network topology information and passes this information to the forwarding plane so that the forwarding plane knows where to forward received packets. Processes that execute the functionality of the control plane are referred to herein as control-plane processes. Typically, the architecture of these two components combines all of the required functionality into a single functional whole with respect to external entities.

As is known in the art, network systems generally include an operating system (e.g., Linux, UNIX, Microsoft Windows, etc.) and one or more processes that run at a user level. Generally, user-level process are written as applications separate and distinct from the processes that are considered to be part of the operating system. With respect to a user-level process, control functionality resides entirely within the application. User-level processes may also be referred to as application-level processes. Kernel-level or system-level processes, on the other hand, are implemented as a service at the operating system level. Individuals with ordinary skill in the art of computer programming understand what a user-level process is and how it differs from an operating system kernel, a kernel-level process, and a system-level process. Sometimes user-level processes are described as running on a particular operating system.

During the operation of a network system, such as a router, information may need to be passed from the forwarding plane to the control plane. The information passed may be referred to herein as a message. A first approach to passing information from the forwarding plane to the control plane involves the forwarding plane being integrated into the operating system. In this approach, the operating system kernel generates a message during its performance of the forwarding-plane functionality and then conveys the message to the control-plane process. Unless herein stated otherwise, a control-plane process is a user-level process. This first approach can be undesirable as it requires an implementer of a network system either to be dependent on the operating system's forwarding-plane process and functionality or to make significant modifications to the operating system to install a desired forwarding-plane process and functionality.

A second approach to passing information from the forwarding plane to the control plane involves having a forwarding-plane process that is a user-level process and, therefore, not integrated into the operating system. This second approach is a more modular approach and allows the forwarding-plane process to be implemented and modified separately from the implementation of the operating system. However, this second approach is based on passing messages through memory shared by the two user-level processes (i.e., the forwarding-plane process and the control-plane process). This shared-memory approach requires locks or synchronization mechanisms to handle the shared memory. Locks and synchronization mechanisms can be complex and instill communication overhead, making the inefficient to operate.

The increasing requirements put on network systems, such as IP routers, require new protocols in the routers, leading to an increased complexity in the control plane and frequently involve and affect the communication between the forwarding plane and the control plane. The present invention provides for safe and efficient passing of messages from a forwarding-plane process operating at a user level to a control-plane process operating at a user level. The present invention provides a more modular approach than is provided by operating systems that provide the forwarding-plane functionality while at the same time requiring less communication overhead than required by shared-memory approaches to communicating messages between a forwarding-plane process at the user level and a control-plane process at the user level.

In accordance with the present invention, information can be passed from a forwarding-plane process to a control-plane process without having to modify the control-plane process and without requiring the processes to pass messages via shared memory. Messages to be passed to the control-plane process are first encoded in the forwarding-plane process. The encoding may be a very simple process such as representing the information as a single integer value. The encoded message is then passed to the operating system. That is, the message can be encoded in a user buffer utilized by the forwarding-plane process and then sent to the operating system. The operating system interprets the encoded message and reports the message to the control plane process. In preferred embodiments, the message can be reported to the control-plane process in the same manner that messages get reported to control-plane processes of the prior art.

FIG. 1 illustrates a process 100 of passing information from a forwarding plane to an operating system and then to a control plane in accordance with the present invention. According to the process 100, a forwarding-plane process 102 executing at a user level encodes 104 information and then passes 106 the information to an operating system. A system-level process 108 interprets 110 the encoded information and passes 112 the information to a control-plane process 114 executing at a user level.

The present invention can be advantageously utilized in passing multicast events from a forwarding-plane process to a control-plane process. Multicasting is a way of efficiently transmitting text, audio, and video on the Internet or an internal network to a select group of people, much like a conference call includes a select group of people. Instead of sending information in individual packets to each recipient, a single message is sent to a multicast group, which includes all the people that want to participate in the multicast session. Thus, multicasting is a one-to-many transmission. In contrast, the traditional method of sending messages on the Internet, called unicasting, is a one-to-one transmission.

Multicasting provides a way for one host to send packets to a selective group of hosts. Users choose to be part of a specific multicast. Multicast packets then travel to the user from the multicast source. An important point is that multicast packets only travel across routes where there is an end user that has requested to be part of the multicast. Users indicate to their local router that they want to be part of a particular multicast group. That router then indicates to the next router closest to the source of the multicast that it wants to receive the multicast. This process continues until a path is established between the multicast source and the person who wants to join the multicast. The result is that only routers that need multicast packets for end systems actually receive those packets. Nonparticipating routers do not receive the packets, making the process more efficient. This keeps multicast packets from crossing parts of the network that do not have multicast participants. Still, on the Internet, a multicast group is potentially huge, with members located around the world.

Internet Protocol ("IP") multicast, an important IP-based network-infrastructure component, lets a network deliver one data stream from a source to a group of destinations. This process saves network bandwidth and provides Quality of Service ("QoS") for time-sensitive applications such as multimedia products. Manufacturers of operating systems (e.g., the Microsoft Corporation) are providing more support for IP multicast in newer versions of their operating systems. However, existing operating systems provide only host-level support for the Internet Group Management Protocol ("IGMP"), a fundamental protocol of IP multicast. Some existing operating systems support IGMP at the host-level and the router-level. In addition, some existing operating systems support IP multicast forwarding, administrative scoping, and the multicast DHCP service, and include a built-in multicast application.

In accordance with the present invention, multicast events can be passed from a forwarding-plane process to a control-plane process without having to modify the control-plane process and without requiring the processes to pass messages via shared memory. While the present invention will be addressed in some detail as it relates to multicasting, it should be understood that the present invention can be advantageously utilized in passing messages, other than multicast messages, from a forwarding plane to a control plane.

In the present invention, the functionality of a forwarding plane is implemented in a forwarding-plane process that operates at the user level. That is, forwarding-plane processes of the present invention are user-level processes. The forwarding-plane process detects the occurrence of a multicast event. Multicast events are known in the art. Examples of multicast events include register messages, asserts, and cache misses. When a detected multicast-event needs to be sent to a control-plane process it is first encoded and sent to the operating system. The encoded multicast-event is referred to herein as an Event Code and in preferred embodiments is a 32-bit integer. When the Event Code is a 32-bit integer, a large number of different events can be sent in this manner. One of ordinary skill in the art will readily understand that many different kinds of events (i.e., not just multicast events) can be encoded and sent to the operating system with a single 32-bit integer.

In one embodiment, a TUN/TAP device driver is utilized to pass encoded information (e.g., an Event Code) to a Linux kernel. TUN/TAP is known in the art and provides packet reception and transmission for user space programs. It can be viewed as a simple Point-to-Point or Ethernet device, which instead of receiving packets from a physical media, receives them from user-level programs and instead of sending packets via physical media writes them to user-level programs.

A socket buffer, or "SKB" is one of the most fundamental data structures in the Linux networking code. Every packet sent or received is handled using this data structure. The most fundamental parts of the SKB structure are as follows:

```
struct sk_buff {
    /* These two members must be first. */
    struct sk_buff        *next;
    struct sk_buff        *prev;
    struct sk_buff_head   *list;
    ...
```

In accordance with the present invention, an Event Code can be transferred to an unused field of the kernel buffer (e.g. skbuff in the case of Linux). For example, in Linux this transfer can be perform with the single line of code listed below.

skbuff->unused=<Event Code>

Minor modifications can be made to existing operating systems in order to interpret encoded information that the operating system receives from a forwarding-plane process. For example, the part of a Linux kernel that performs forwarding-plane functionality for handling multicast events may have code that performs similar to the following psuedo-code description:

```
ip_mr_input(..)
{
    {
    - native Linux multicast table look up
    - native event generating mechanism
    - use cache_report to report the event to the control plane
    }
}
```

According to the above-described section of code in the prior art, the Linux kernel performs a multicast table look up and then generates a multicast event. Once the multicast event is generated, the cache_report function is used to report the multicast event to the control plane. The control-plane process can then perform whatever functionality is needed to handle the multicast event appropriately. The above code might be found in an operating system that performs the functionality of the forwarding plane.

In accordance with the present invention, the above Linux-kernel code can be modified so as to perform in accordance with the following psuedo-code description:

```
ip_mr_input(..)
{
    {
    - interpret the Event Code
    - use the native Linux call cache_report to report the event
      to the control plane
    }
}
```

Thus, instead of performing a multicast table look up and generating a multicast event, the Linux kernel can be modified to interpret the Event Code that was passed to the operating system and copied to a kernel buffer (e.g., skbuff). When the Event Code is interpreted, it is put in a format that is appropriate for reporting the multicast event to the control plane. The format may be identical to that which is used in the prior art. At this point, the Linux kernel can report the multicast event in exactly the same manner as is done in the prior art. For example, in the two sections of Linux-kernel code described above the exact same call to the cache_report function can be used to report a multicast event to the control plane. Control-plane processes do not need to be modified to operate in accordance with the present invention. That is, once the Event Code has been interpreted in the operating system, a method of reporting the multicast event known in the art can be used and the control-plane process that handles the reported multicast event can be a control-plane process known in the art.

In accordance with the present invention, it has been shown that information can be passed from a forwarding-plane process to a control-plane process without having to modify the control-plane process and without requiring the forwarding-plane process and control-plane process to use shared-memory mechanisms to pass the information. While the present invention has been shown and described herein with reference to specific embodiments thereof (e.g., passing multicast events), it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. A method for conveying information from a forwarding-plane process to a control-plane process, comprising:
    encoding the information in the forwarding-plane process;
    passing the encoded information from the forwarding-plane process to an operating system;
    interpreting the encoded information in the operating system; and
    reporting the encoded information to the control-plane process, the information being passed from the forwarding-plane process to the control-plane process via an unused field in a kernel buffer of the operating system so that messages need not be passed from the forwarding-plane process to the control-plane process through shared memory;
    wherein encoding the information in the forwarding-plane process includes:
    detecting an occurrence of a multicast event;
    creating an event code, based on the multicast event, at a data-plane process operating at a user level, wherein the event code comprises an encoded version of the multicast event, the data-plane process using a first memory mechanism, the event code representing the multicast event; and passing the event code to a kernel of the operating system;
wherein interpreting the encoded information in the operating system includes:
　　via a system-level process, interpreting the event code; and
　　formatting the event code according to a format handled by the control-plane process, the control-plane process operating at the user-level;
wherein reporting the encoded information to the control-plane process includes:
　　reporting a formatted event code from the operating system to the control-plane process, the control-plane process using a second memory mechanism, wherein the second memory mechanism is separate from the first memory mechanism.

2. The method of claim 1, wherein reporting includes transferring the encoded information to a socket buffer of the operating system.

3. The method of claim 1, wherein the operating system is a linux operating system.

4. The method of claim 1, wherein the information comprises a multicast event.

5. The method of claim 4, wherein the operating system is a linux operating system.

6. A non-transitory computer-readable medium containing an executable program for performing a method for conveying information from a forwarding-plane process to a control-plane process, the method comprising:
　　encoding the information in the forwarding-plane process;
　　passing the encoded information from the forwarding-plane process to an operating system;
　　interpreting the encoded information in the operating system; and
　　reporting the encoded information to the control-plane process,
　　the information being passed from the forwarding-plane process to the control-plane process via an unused field in a kernel buffer of the operating system so that messages need not be passed from the forwarding-plane process to the control-plane process through shared memory;
wherein encoding the information in the forwarding-plane process includes:
　　detecting an occurrence of a multicast event;
　　creating an event code, based on the multicast event, at a data-plane process operating at a user level, wherein the event code comprises an encoded version of the multicast event, the data-plane process using a first memory mechanism, the event code representing the multicast event; and
　　passing the event code to a kernel of the operating system;
wherein interpreting the encoded information in the operating system includes:
　　via a system-level process, interpreting the event code; and
　　formatting the event code according to a format handled by the control-plane process, the control-plane process operating at the user-level;
wherein reporting the encoded information to the control-plane process includes:
　　reporting a formatted event code from the operating system to the control-plane process, the control-plane process using a second memory mechanism, wherein the second memory mechanism is separate from the first memory mechanism.

7. The non-transitory computer-readable medium of claim 6, wherein reporting includes transferring the encoded information to a socket buffer of the operating system.

8. The non-transitory computer-readable medium of claim 6, wherein the operating system is a linux operating system.

9. The non-transitory computer-readable medium of claim 6, wherein the information comprises a multicast event.

10. The non-transitory computer-readable medium of claim 9, wherein the operating system is a linux operating system.

11. A networking system adapted to convey information from a forwarding-plane process to a control-plane process by:
　　encoding the information in the forwarding-plane process;
　　passing the encoded information from the forwarding-plane process to an operating system executed via at least one processor;
　　interpreting the encoded information in the operating system; and
　　reporting the encoded information to the control-plane process;
　　passing the information from the forwarding-plane process to the control-plane process via an unused field in a kernel buffer of the operating system so that messages need not be passed from the forwarding-plane process to the control-plane process through shared memory;
wherein encoding the information in the forwarding-plane process includes:
　　detecting an occurrence of a multicast event;
　　creating an event code, based on the multicast event, at a data-plane process operating at a user level, wherein the event code comprises an encoded version of the multicast event, the data-plane process using a first memory mechanism, the event code representing the multicast event; and
　　passing the event code to a kernel of the operating system;
wherein interpreting the encoded information in the operating system includes:
　　via a system-level process, interpreting the event code; and
　　formatting the event code according to a format handled by the control-plane process, the control-plane process operating at the user-level;
wherein reporting the encoded information to the control-plane process includes:
　　reporting a formatted event code from the operating system to the control-plane process, the control-plane process using a second memory mechanism, wherein the second memory mechanism is separate from the first memory mechanism.

12. The networking system of claim 11, wherein reporting includes transferring the encoded information to a socket buffer of the operating system.

13. The networking system of claim 11, wherein the operating system is a linux operating system.

14. The networking system of claim 11, wherein the information comprises a multicast event.

15. The networking system of claim 14, wherein the operating system is a linux operating system.

16. The method as in claim 1, wherein creating the event code includes:
　　representing the multicast event according to a 32-bit integer scheme.

* * * * *